UNITED STATES PATENT OFFICE.

ASHLEY V. BLACK, OF ST. LOUIS, MISSOURI, ASSIGNOR TO GRAIN PRODUCTS COMPANY, OF ST. LOUIS, MISSOURI, A CORPORATION OF DELAWARE.

FOOD PRODUCT.

1,206,804.

Specification of Letters Patent. Patented Dec. 5, 1916.

No Drawing. Application filed August 18, 1916. Serial No. 115,591.

*To all whom it may concern:*

Be it known that I, ASHLEY V. BLACK, a citizen of the United States, residing at the city of St. Louis, State of Missouri, have invented a certain new and useful Food Product, of which the following is a specification.

This invention relates to a certain new and useful food product.

Bran, and especially bran of wheat, has, as is commonly known, great laxative properties, but is, of and by itself, unpalatable and of little or no food value. I have found, however, that by intimately associating or mixing with the bran certain constituents of pleasing taste and of known food value, I may provide and furnish to the consuming public at relatively low cost a delightfully palatable and nutritious food product possessing and retaining all the laxative effect or property of bran.

In Letters Patent No. 1186768, of June 13, 1916, there is described a food product comprising, as its elements, bran and an edible syrup mixed or combined with a previously cooked flour, such as cracker meal. The flour being precooked or in edible condition as it is mixed or combined with the bran, prolonged cooking or baking in evolving the finished product is obviated; but, due to the cost of cracker meal, which is more or less expensive, the manufacturing costs of that product are relatively high.

The object of my present invention is to provide at less expense a palatable, nutritious, and laxative manufactured food product having bran as one of its ingredients or constituents.

To the end stated, and in the production of my present food product, I use and mix or combine the bran and edible syrup with a raw cereal in a more or less finely divided or ground form, such as wheat flour, rye flour, corn flour, or graham flour, which is exceedingly rich in food value. My present food product hence includes, as original essential elements or constituents, bran, preferably wheat bran, a raw cereal in a more or less finely divided or ground form, and an edible syrup, these several ingredients or constituents being combined or mixed, to obtain the best results, in the proportions approximately of thirty-seven and one-half per cent. bran, twenty-five per cent. cereal, and thirty-seven and one-half per cent. edible syrup.

In producing my present food product, and in providing first the edible syrup, I mix together in a suitable receptacle strained honey and a sweet syrup, such as molasses, cane syrup, maple syrup, corn syrup, or the like, in approximately equal parts. I then preferably heat this syrup-mixture until the same is of relatively thin consistency, so that it will pour easily. I then, also in a suitable receptacle or mechanical mixer, commingle the bran with, say, approximately half the raw cereal, then pour into the mixer the relatively thin, hot syrup, and then thoroughly and intimately mix the syrup with the bran and cereal. I then add to the mass in the mixer the remainder or other half of the cereal, and then again mix the several ingredients together, the syrup, in addition to contributing food value and an agreeable sweet taste to the finished product, serving also as a binder for the bran and cereal, which are, respectively and preferably, in flake and ground form. The mass or mixture is now ready for cooking or baking, but, that the finished product may be conveniently handled and supplied to consumers, I first mold or otherwise form the mass into suitable individual cakes or biscuits. Accordingly, suitable relatively small or individual molds preferably of somewhat rectangular form or shape being provided and at hand, the same are respectively filled with the said thoroughly mixed and combined ingredients, the material in each mold being suitably compactly pressed therein. The several molds so filled are now reversely placed upon a suitable preferably metal cooking surface, the molds duly removed, and the several so formed raw cakes or biscuits with their supporting cooking-surface placed within a suitable oven, under the heat of which, at approximately 300° to 400° F., the several cakes or biscuits are permitted to remain a suitable length of time, approximately from thirty to sixty minutes, the several cakes or biscuits being thereby thoroughly cooked or baked, sterilized, and relatively hardened. On being removed from the oven, the several food-cakes or biscuits are suitably cooled and are then ready for consumption, my new food-cakes or biscuits being preferably packed and wrapped for shipment in suitable containers, cartons, or the like.

My new food cakes or biscuits are most agreeable to the taste, exceedingly nutritious and nourishing, and of high laxative value, and, further, may be manufactured or produced and furnished to consumers at approximately minimum cost.

Having thus described my invention, what I claim and desire to secure by Letters Patent is:

1. As a new article of manufacture, the edible biscuit or cake herein described, the same being made from, and including only as its original elements, bran, a raw cereal, and a syrup, intimately mixed together, compactly molded into biscuit or cake form, and baked.

2. As a new article of manufacture, the edible biscuit or cake herein described, the same being made from, and including only as its original elements, bran, a finely divided raw cereal, and a sweet laxative syrup, intimately mixed together, compactly molded into biscuit or cake form, and baked.

3. As a new article of manufacture, the edible biscuit or cake herein described, the same being made from, and including only as its original elements, bran, a finely divided raw cereal, and a sweet laxative syrup, intimately mixed together in the proportions approximately of thirty-seven and one-half per cent. bran, twenty-five per cent. cereal, and thirty-seven and one-half per cent. syrup, compactly molded into biscuit or cake form, and baked.

In testimony whereof, I have signed my name to this specification.

ASHLEY V. BLACK.